United States Patent
Mun

(10) Patent No.: US 7,607,510 B1
(45) Date of Patent: Oct. 27, 2009

(54) COLLISION DETECTION SYSTEM FOR VEHICLE

(75) Inventor: Sung Ho Mun, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/345,115

(22) Filed: Dec. 29, 2008

(30) Foreign Application Priority Data

Jun. 2, 2008 (KR) .................... 10-2008-0051445

(51) Int. Cl.
*B60K 28/10* (2006.01)
*B60T 7/12* (2006.01)
*B60T 7/22* (2006.01)

(52) U.S. Cl. .............. 180/274; 180/282; 280/735; 701/45

(58) Field of Classification Search ............ 280/735; 180/271, 274, 282; 701/45
See application file for complete search history.

(56) References Cited

U.S. PATENT DOCUMENTS

| | | | |
|---|---|---|---|
| 6,023,664 A * | 2/2000 | Bennet | 702/141 |
| 6,032,092 A * | 2/2000 | Laaser | 701/45 |
| 6,104,284 A * | 8/2000 | Otsuka | 340/440 |
| 6,424,897 B1 * | 7/2002 | Mattes et al. | 701/45 |
| 6,611,784 B2 * | 8/2003 | Tobaru et al. | 702/151 |
| 6,681,196 B2 * | 1/2004 | Glaser et al. | 702/151 |
| 7,109,856 B2 * | 9/2006 | Lu et al. | 340/440 |
| 7,120,528 B2 * | 10/2006 | Salib et al. | 701/45 |
| 7,430,468 B2 * | 9/2008 | Salib et al. | 701/70 |
| 7,451,032 B2 * | 11/2008 | Brown et al. | 701/70 |
| 2006/0095182 A1 * | 5/2006 | Lahmann et al. | 701/45 |

FOREIGN PATENT DOCUMENTS

KR        100698716        3/2007

* cited by examiner

*Primary Examiner*—Toan C To
(74) *Attorney, Agent, or Firm*—Edwards Angell Palmer & Dodge LLP; Peter F. Corless

(57) ABSTRACT

Disclosed herein is a collision detection system for a vehicle. The collision detection system for a vehicle according to the present invention includes a sensor unit and a control unit. The sensor unit measures impacts A and B along two axes that intersect each other in diagonal directions. The control unit calculates a longitudinal impact X and a transverse impact Y using the measured impacts A and B, and determines the direction of collision and whether to operate at least one device for protection against collision-related injury using the impacts.

6 Claims, 4 Drawing Sheets

COLLISION DETECTION SYSTEM FOR VEHICLE

CROSS-REFERENCE TO RELATED APPLICATIONS

This application claims under 35 U.S.C. §119(a) priority to Korean Application No. 10-2008-0051445, filed on Jun. 2, 2008, the disclosure of which is incorporated herein by reference in its entirety.

BACKGROUND

1. Technical Field

The present invention relates generally to a collision detection system for a vehicle that can check whether a collision has occurred using the impact detection sensors of a vehicle and determine whether to operate at least one device for protection against collision-related injury.

2. Related Art

Various types of devices for protection against collision-related injury are installed in vehicles in order to protect driver/passengers against injury caused by collisions. Representative examples of such devices include an airbag, a device for fastening up safety belts, and a device for manipulating a seat to protect the backbone. Whether to deploy such a device for protection against collision-related injury is determined by the control unit of a collision detection system.

With reference to FIGS. 1 and 2, a conventional collision detection system for a vehicle will be described below. FIG. 1 is a diagram showing the sensors of a conventional collision detection system for a vehicle. The conventional collision detection system measures impacts in respective directions using the left sensor 10 and right sensor 20 of the front part of a vehicle and the detection sensor 32 and safing sensor 34 of a vehicle sensor unit 30. Of these sensors, the detection sensor 32 measures impacts attributable to front and side collisions of a vehicle, transmits them to a control unit, and checks, using the safing sensor 34, whether the detection sensor 32 is operating erroneously. The reliability of the system is guaranteed by checking one or more impacts again using the safing sensor 34 even when the impact or impacts measured by the detection sensor 32 exceed a predetermined value or values.

FIG. 2 is a diagram showing the construction of the conventional collision detection system for a vehicle. The conventional collision detection system for a vehicle includes the sensor unit 30 and a control unit 50. The sensor unit 30 includes the detection sensor 32 and the safing sensor 34. The control unit 50 determines whether to deploy a device for protection against collision-related injury on the basis of the impacts measured by the detection sensor 32 using a collision determination algorithm 52, and ensures the reliability of the system on the basis of impacts measured by the safing sensor 34 through a safing module 54. Only when the measured impacts satisfy both the collision determination algorithm 52 and the safing module 54 is the device for protection against collision-related injury deployed.

However, since the conventional collision detection system for a vehicle checks the reliability of the system using the separate safing sensor 34 in addition to the central detection sensor 32, the conventional collision detection system has problems in that the manufacturing cost thereof is high and a large number of manufacturing steps are required.

The above information disclosed in this Background section is only for enhancement of understanding of the background of the invention and therefore it may contain information that does not form the prior art that is already known in this country to a person of ordinary skill in the art.

SUMMARY

One of the objects of the present invention is to ensure the reliability of a collision detection system for a vehicle without installing a separate sensor.

In order to accomplish the above object, one aspect of the present invention provides a collision detection system for a vehicle, including a sensor unit for measuring impacts A and B caused by a collision that are applied, respectively, along two axes that intersect each other in diagonal directions of a vehicle; and a control unit for calculating a longitudinal impact X and a transverse impact Y using the measured impacts A and B, and determining, on the basis of the impacts A, B, X, and Y, the direction of the collision and whether to operate at least one device for protection against collision-related injury.

The sensor unit may be installed on a central portion of the vehicle.

The control unit may distinguish a front collision and a side collision from each other by comparing the magnitude of the impact X with the magnitude of the impact Y.

The control unit may operate the device or devices for protection against collision-related injury if the impact X, Y, or both are greater than an operational reference value or values.

The control unit may operate the device for protection against collision-related injury if the impact A is greater than a first reference value and the impact B is greater than a second reference value.

The control unit may operate the device for protection against collision-related injury if the impact X is greater than a third reference value and the impact Y is greater than a fourth reference value.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
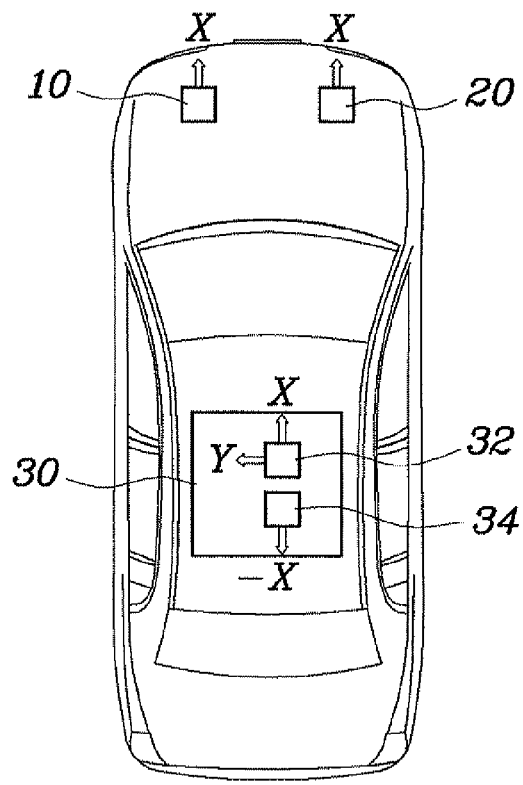
FIG. 1 is a diagram showing the sensors of a conventional collision detection system for a vehicle.
Figure 2:
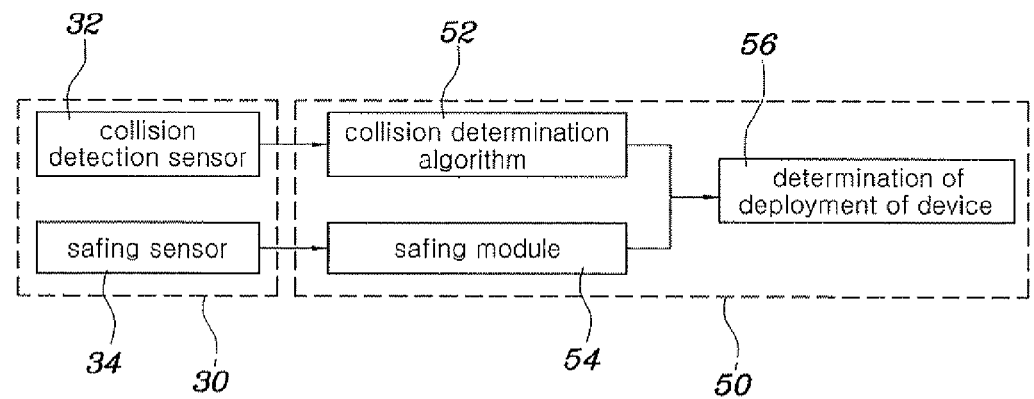
FIG. 2 is a diagram showing the construction of the conventional collision detection system for a vehicle.

Collision detection systems for a vehicle according to preferred embodiments of the present invention will be described below with reference to the accompanying drawings, in which the same reference numerals are used throughout the different drawings to designate the same or similar components.

Figure 3:
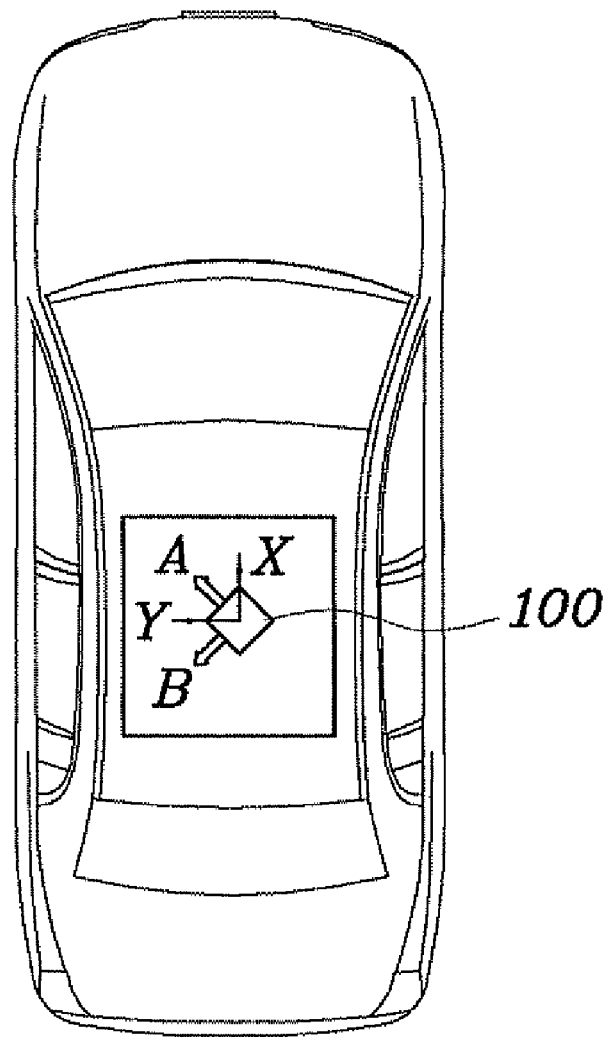
FIG. 3 is a drawing showing the sensor unit of the collision detection system for a vehicle according to an embodiment of the present invention.
Figure 5:
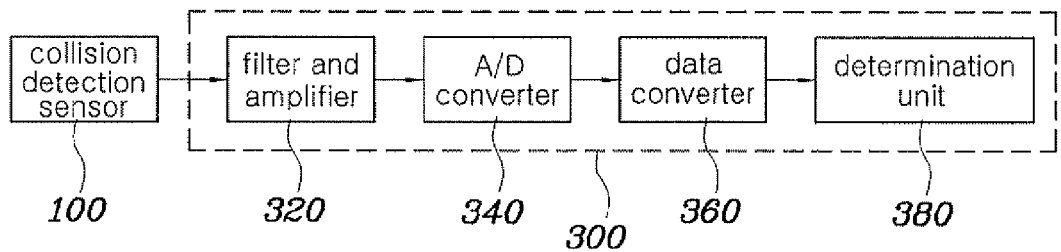
FIG. 5 is a drawing showing the construction of the collision detection system for a vehicle according to an embodiment of the present invention.

A collision detection system for a vehicle according to an embodiment of the present invention, as shown in FIG. 5, includes a sensor unit 100 and a control unit 300. As shown in FIG. 3, the sensor unit 100 measures impacts A and B along two axes that intersect each other in diagonal directions. The control unit 300 calculates an impact X in a longitudinal direction and an impact Y in a transverse direction using the impacts A and B, and determines, on the basis of the impacts, the direction of collision and whether to operate at least one device for protection against collision-related injury.

With reference to FIG. 3, the sensor unit 100 independently measures impacts A and B applied to the axes that intersect each other in the diagonal directions of a vehicle. Preferably, the sensor unit 100 may be installed at the center of the vehicle.

Figure 4:
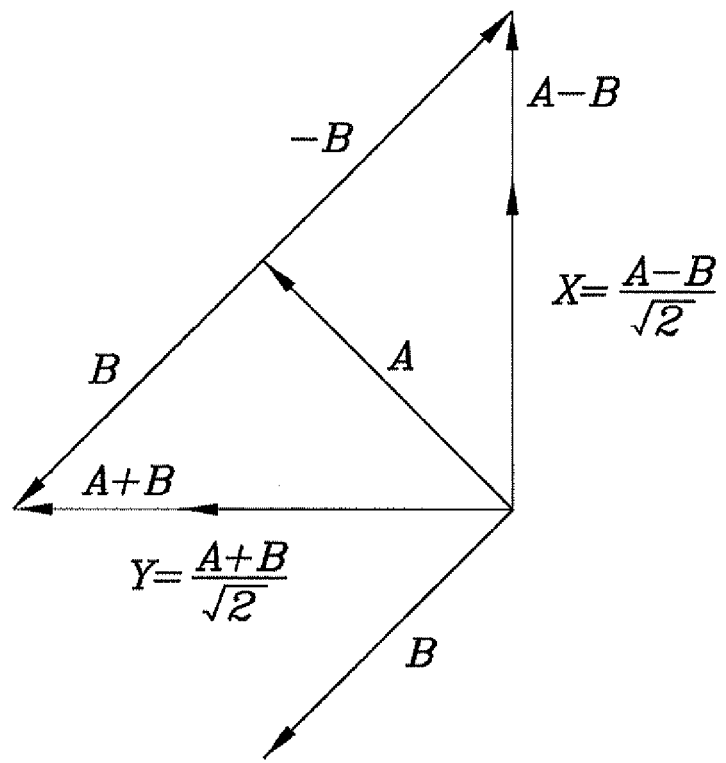
FIG. 4 is a drawing showing a process of calculating impacts X and Y using the collision detection system for a vehicle according to an embodiment of the present invention.

FIG. 4 is a drawing showing a method of calculating the longitudinal and transverse impacts X and Y using the impacts A and B that are measured by the sensor unit 100.

The impacts A, B, X and Y are all vector values. For ease and simplicity of description, it is assumed that the respective axes along which the impacts A and B are measured are perpendicular to each other. Moreover, it is assumed that the two axes along which the impacts A and X are measured are set such that the axes intersect each other at an angle of 45 degrees. Here, the impact X is the sum of a result based on the impact A and a result based on the impact B, $X = A*\cos 45° - B*\cos 45°$. Accordingly, $$X = \frac{a-b}{\sqrt{2}}.$$

$Y = A*\cos 45° + B*\cos 45°$. Accordingly, $$Y = \frac{a+b}{\sqrt{2}}.$$

Although the two equations are derived under the above-described two assumptions, various angles may be set depending on the length or width of a vehicle in the actual practice of the present invention, and the impacts X and Y can be derived from the angles that are formed between the impacts A and B and the impacts X and Y.

FIG. 5 is a diagram showing the construction of the collision detection system for a vehicle. The impacts A and B measured by the sensor unit 100 are corrected through the filter and amplifier 320 of the control unit 300 and are converted into digital signals through an Analog-to-Digital (A/D) converter 340. The impacts X and Y are calculated through a data converter 360. The measured A and B and the calculated X and Y are provided to a determination unit 380, and the determination unit 380 determines the direction of collision and whether to operate the device or devices for protection against collision-related injury on the basis of the measured and calculated values.

Collisions are classified into front collisions and side collisions, and whether to operate the device or devices for protection against collision-related injury is determined on the basis of comparison with one or more preset reference values.

Figure 6:
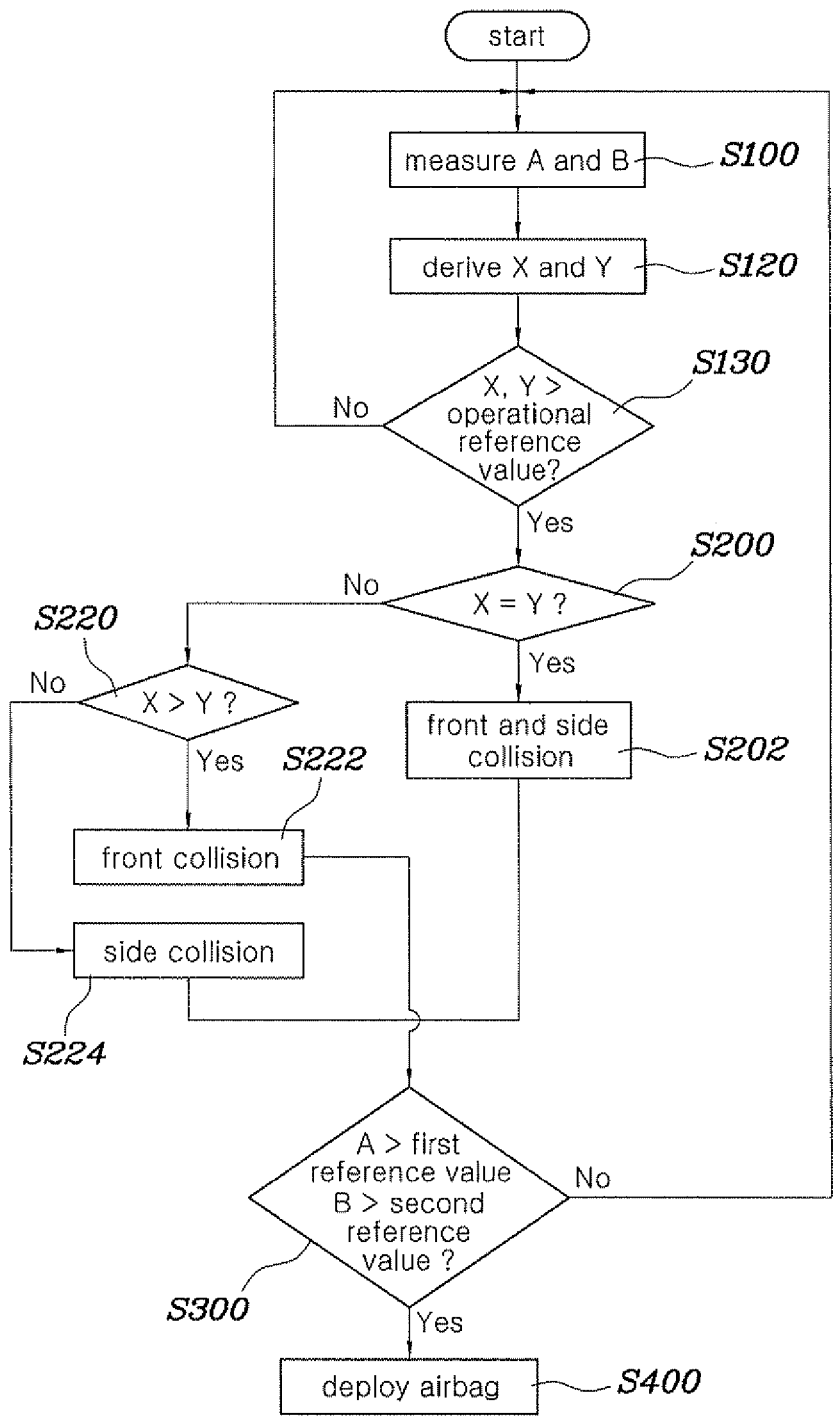
FIG. 6 is a flowchart showing the sequence of the operation of the collision detection system for a vehicle shown in FIG. 5.

Referring to FIG. 6, the operation of the collision detection system for a vehicle will be described below. First, the impacts A and B are measured through the sensor unit 100 and the impacts X and Y are calculated from the impacts A and B at steps S100 and S120. If the calculated impact X, Y, or both exceed an preset operational reference value or values, it is determined that a collision has occurred at step S130.

If it is determined that the collision has occurred, the impacts X and Y are compared with each other at step S200. If the impacts X and Y are equal to each other, it is determined that a front and side collision has occurred, and then at least one device for protection against front and side collision-related injury may be operated at step S202. If the impact X is greater than the impact Y, it is determined that a front collision has occurred, and then a device for protection against front collision-related injury may be operated at steps S220 and S222. If the impact X is less than the impact Y, it is determined that a side collision has occurred, and a device for protection against side collision-related injury may be operated at steps S220 and S224

In order to determine whether the calculation of the impacts X and Y is based on an erroneous operation, the impacts A and B are checked again at step S300. The impacts A and B are measured independently of each other. Accordingly, if the impacts X and Y are derived as a result of an erroneous operation involving only the impact A, whether the erroneous operation has occurred can be determined by comparing the impact B with a predetermined reference value, and vice versa. The reason for this is that if the impact A has been measured along its corresponding axis, the impact B will be measured along its corresponding axis. With this, the prior art safing sensor is not required in the present invention. The impacts A and B are used not only to derive the impacts X and Y so as to determine the occurrence of a collision, but also to detect mutual sating. That is, only when the impacts A and B exceed the first and second reference values, respectively, even in the case where the impact X, Y, or both exceed the operational reference value or values a device or devices for protection against collision-related injury can be activated.

In a modified embodiment, the impacts X and Y may be used for the criteria for sating instead of the impacts A and B. In this case, third and fourth reference values can be set for the impacts X and Y.

The first, second, third, and fourth reference values may be set to be identical or different depending on the situation.

According to the present invention, not only the impacts X and Y along the lateral and vertical directions of a vehicle but also the impacts A and B along the diagonal directions thereof can be detected, various embodiments can be implemented using the impacts having directionality, and the collision detection system for a vehicle can be reliably managed using a small number of sensors.

According to the collision detection system for a vehicle constructed as described above, whether the sensor unit erroneously operates can be determined without the use of a separate safing sensor, so that the manufacturing cost of the system and the number of steps of manufacturing work can be reduced, and so that the system can be reliably managed using not only the longitudinal and transverse impacts but also diagonal impacts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A collision detection system for a vehicle, comprising:
    a sensor unit for measuring impacts A and B caused by a collision which are applied, respectively, along two axes that intersect each other in diagonal directions of a vehicle; and
    a control unit for calculating a longitudinal impact X and a transverse impact Y using the measured impacts A and B, and determining the direction of the collision and whether to operate at least one device for protection against collision-related injury using the impacts A, B, X and Y.

2. The collision detection system for a vehicle as set forth in claim 1, wherein the sensor unit is installed on a central portion of the vehicle.

3. The collision detection system for a vehicle as set forth in claim 1, wherein the control unit distinguishes a front collision and a side collision from each other by comparing magnitude of the impact X with magnitude of the impact Y.

4. The collision detection system for a vehicle as set forth in claim 1, wherein the control unit operates the device or devices for protection against collision-related injury if the impact X or Y or the impacts X and Y are greater than an operational reference value or values.

5. The collision detection system for a vehicle as set forth in claim 4, wherein the control unit operates the device or devices for protection against collision-related injury if the impact A is greater than a first reference value and the impact B is greater than a second reference value.

6. The collision detection system for a vehicle as set forth in claim 4, wherein the control unit operates the device or devices for protection against collision-related injury if the impact X is greater than a third reference value and the impact B is greater than a fourth reference value.

* * * * *